Patented Oct. 28, 1930

1,779,508

UNITED STATES PATENT OFFICE

MAX WYLER, OF BLACKLEY, MANCHESTER, ENGLAND, ASSIGNOR TO IMPERIAL CHEMICAL INDUSTRIES, LIMITED, OF LONDON, ENGLAND

SULPHIDE DYES AND PROCESS OF MAKING

No Drawing. Application filed May 23, 1929, Serial No. 365,569, and in Great Britain February 26, 1929.

This invention relates to the manufacture of new sulphide dyes, and in particular to the production of a bright orange dye of this class.

My new sulphide dyes may be obtained by the sulphurization of a mixture of one molecular proportion of nitro-aceto-p-xylidide with two or more molecular proportions of benzidine by heating the mixture with sulphur. The new sulphide dyes thus obtained give orange dyeings which are of excellent fastness and which are particularly remarkable for their brightness and clarity of shade.

The nitroaceto-p-xylidide having the formula

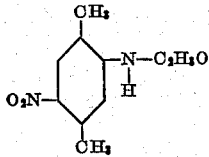

may be obtained by the nitration of aceto-p-xylidide in sulphuric acid by means of mixed acid in the cold, e. g. as described in the example below.

The result obtained according to our invention is all the more surprising since the substitution of nitroaceto-m-xylidide or nitroaceto-o-toluidide for the nitroaceto-p-xylidide leads to practically worthless dyes, as does the use of tolidine in place of benzidine, or of formyl derivatives in place of acetyl derivatives.

However, I have found that in my process I may substitute amino-aceto-para-xylidide for nitro-aceto-para-xylidide and obtain new sulphide dyes similar to those produced from the nitro compound. It may be that in my process during the reaction the nitro group is reduced to the amino group. In carrying out my process I may first reduce the nitro compound to the corresponding amino compound and then effect the sulphurization, or I may use the nitro compound direct. By my process I produce new sulphide dyes from aceto-para-xylidide compounds having the formula

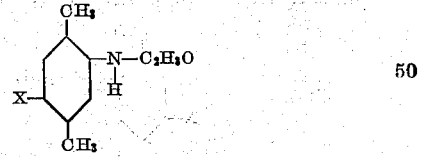

wherein X represents a nitro or an amino group. By heating such xylidide compounds in the presence of two or more molecular proportions of benzidine, and sulphur I obtain sulphide dyes which dye cotton in bright orange shades. New and valuable sulphide dyes are obtained from both the nitro and amino compounds of the class indicated above.

The following example represents the preferred method of carrying out my invention. It will be understood that minor variations in the proportions of the reagents, or in the temperature conditions, do not seriously affect the result.

*Example.*—Aceto-p-xylidide (1 molecular proportion) is dissolved in 6 times its weight of 100 per cent sulphuric acid and nitrated by addition of a mixture of sulphuric acid and nitric acid equivalent to 1 molecular proportion of nitric acid plus 5 per cent excess the temperature being maintained at 0–5° C. The nitro compound is isolated by pouring into ice-water and filtering the mixture.

The nitro compound may be reduced in any convenient manner, for example by means of iron water, and a little acetic acid. An excess of sodium carbonate is added, and the whole is filtered hot. The aminoaceto-p-xylidide crystallizes out on cooling, and obtained in this way has M. P. 141–142° C.

For the preparation of the new dye 11 parts by weight of the amino-aceto-p-xylidide are mixed with 48 parts by weight of benzidine and 112 parts by weight of sulphur. The mixture is heated, with stirring, at 200–250° C. for several hours. The dye is isolated in the usual way by solution in alkali or alkali sulphide and reprecipitation with acid, or with salt or sodium bicarbonate.

The product is a red brown powder which dyes cotton from a sulphide bath in orange shades.

By using nitro aceto-p-xylidide in place of the amino compound, the latter is obtained in the course of the process and a similar dye is produced.

What I claim and desire to secure by Letters Patent is:—

1. A process for the manufacture of new sulphide dyes which comprises the heating of one molecular proportion of nitro-aceto-p-xylidide in the presence of two or more molecular proportions of benzidine with sulphur.

2. A process for the manufacture of new sulphide dyes which comprises the heating of one molecular proportion of an aceto-para-xylidide having the formula

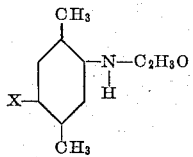

wherein X represents a nitro or amino group, in the presence of two or more molecular proportions of benzidine with sulphur.

3. A process for the manufacture of new sulphide dyes which comprises the heating of one molecular proportion of amino-aceto-para-xylidide in the presence of two or more molecular proportions of benzidine with sulphur.

4. In the manufacture of new sulphide dyes from aceto-para-xylidide compounds having the formula

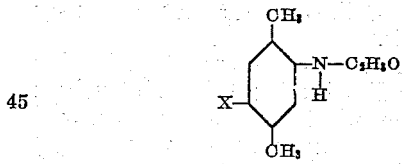

wherein X represents a nitro or an amino group, the process which comprises mixing one molecular proportion of such compound with two or more molecular proportions of benzidine, adding sulphur to said mixture, and then heating the mixture thus produced to a temperature between 200 to 250° C. until the reaction is substantially completed and recovering the dyestuff thus produced.

5. As new sulphide dyes, the dyes obtainable by the process of claim 4, the said dyes being red brown powders which dye cotton from a sulphide bath in bright orange shades.

6. As a new sulphide the dye obtainable by the process of claim 1, the said dye being a red brown powder which dyes cotton from a sulphide both in bright orange shades.

7. As a new sulphide the dye obtainable by the process of claim 3, the said dye being a red brown powder which dyes cotton from a sulphide bath in bright orange shades.

8. As new sulphide dyes, the dyes obtainable by heating one molecular proportion of an aceto-para-xylidide compound having the formula

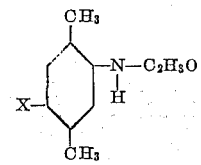

wherein X represents a nitro or an amino group, in the presence of two or more molecular proportions of benzidine with sulphur, the said dyes being red brown powders which dye cotton from a sulphide bath in orange shades.

9. Textile materials dyed with the dyes of claim 8.

10. As a new product, a dyed cotton having a bright orange shade, the said dyed cotton being dyed with the dyes of claim 8.

In testimony whereof I affix my signature.

MAX WYLER.